(12) United States Patent
Jochum et al.

(10) Patent No.: US 12,450,247 B2
(45) Date of Patent: Oct. 21, 2025

(54) DATA EXTRACTION SYSTEM

(71) Applicant: BASF SE, Ludwigshafen am Rhein (DE)

(72) Inventors: Mara Nikola Jochum, Ludwigshafen (DE); Kevin Kiefer, Ludwigshafen (DE); Constanze Risse, Ludwigshafen (DE); Jessica Eleanor Bean, Ludwigshafen (DE); Glauco Battagliarin, Ludwigshafen (DE); Prashant Deshmukh, Ludwigshafen (DE); Florian Sittel, Ludwigshafen (DE); Oliver Christian Gobin, Ludwigshafen (DE); Astrid Elisa Niederle, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 239 days.

(21) Appl. No.: 17/602,301

(22) PCT Filed: Apr. 9, 2020

(86) PCT No.: PCT/EP2020/060207
§ 371 (c)(1),
(2) Date: Oct. 8, 2021

(87) PCT Pub. No.: WO2020/208163
PCT Pub. Date: Oct. 15, 2020

(65) Prior Publication Data
US 2022/0164363 A1 May 26, 2022

(30) Foreign Application Priority Data
Apr. 12, 2019 (EP) ..................... 19168877

(51) Int. Cl.
*G06F 16/25* (2019.01)
*G06F 16/21* (2019.01)

(52) U.S. Cl.
CPC .......... *G06F 16/254* (2019.01); *G06F 16/212* (2019.01)

(58) Field of Classification Search
CPC ........................... G06F 16/212; G06F 16/254
See application file for complete search history.

(56) References Cited

U.S. PATENT DOCUMENTS

| | | | |
|---|---|---|---|
| 2006/0167911 A1 | 7/2006 | Le Cam | |
| 2008/0046929 A1* | 2/2008 | Cho | H04N 21/2665 348/E7.071 |

(Continued)

FOREIGN PATENT DOCUMENTS

CN 106055652 A 10/2016

OTHER PUBLICATIONS

International Search Report and Written Opinion for corresponding PCT/EP2020/060207 mailed May 7, 2020, 11 Pages.

(Continued)

*Primary Examiner* — Charles D Adams
(74) *Attorney, Agent, or Firm* — Armstrong Teasdale LLP

(57) ABSTRACT

Described herein is a data extraction system for extracting data from one or more tabular data files. The system includes a user interlace adapted for facilitating one or more users to submit one or more tabular data files, each tabular data file including at least one table.

10 Claims, 5 Drawing Sheets

(56) References Cited

U.S. PATENT DOCUMENTS

| | | | | |
|---|---|---|---|---|
| 2008/0270340 A1* | 10/2008 | Abrams | ................ | G06F 16/22 |
| | | | | 707/999.102 |
| 2014/0122412 A1 | 5/2014 | Bandekar et al. | | |
| 2016/0292240 A1 | 10/2016 | Diwan et al. | | |
| 2018/0210935 A1* | 7/2018 | Yazicioglu | ............ | G06F 40/186 |
| 2020/0210427 A1* | 7/2020 | Dugan | ................ | G06F 16/907 |

OTHER PUBLICATIONS

Song Y S et al, "TMA-TAB: A spreadsheet-based document for exchange of tissue microarray data based on the issue microarray-object model", Jun. 2010 (Jun. 2010), vol. 43, No. 3, p. 435-441.

\* cited by examiner

Fig. 2

| Lehmboden exp. - Druck | Sandboden exp. - Druck | Mischung exp. - Druck | Mischung nicht exp. - Druck | Summenformelberechnung |
|---|---|---|---|---|

| Oxitop Auswertung - Methode: Druck-P | | | | |
|---|---|---|---|---|
| Laborjournalnummer | GM0878-163 | | Probe | Blank |
| Testbezeichnung | | | Formel C | |
| Messmethode | Druck-p | | Formel 13C | |
| Messdauer [Tage] | 90 | | Formel H | |
| Temperatur [°C] | 25 | | Formel O | |
| Temperatur [K] | 298.15 | | Molekulargewicht [g/mol] | |
| Testboden | French-Clay-Exposed | | Einwaage (Probe) [mg] | |
| Gesamtvolumen (abzüglich Köcher etc.) [mL] | 304.09 | | Einwaage (Probe) [mmol] | |
| | | | C-Anteil (TOC oder Formel) [%] | |
| Bodenvolumen (inkl. Wasser) [mL] | 35.33 | | Einwaage (Kohlenstoff) [mg] | |
| Freies Volumen (Headspace) [mL] | 268.76 | | Einwaage (Kohlenstoff) [mmol] | |
| | | | ThOD (bezogen auf Probe) [mg] | |
| | | | ThOD (bezogen auf Probe) [mmol] | |
| | | | Th. max Dp [hPa] | |
| | | | Polymergehalt (Probe) [%] | |

Tables

| General parameters | Sample parameters | Sample IDs | Sample Measurements | Sample Measurements Blank | Sample Measurements |
|---|---|---|---|---|---|

Template_soil

+ o -

Group: Add

Table: Add Remove

Type: Header Data Remove

DATA EXTRACTION SYSTEM

CROSS-REFERENCE TO RELATED APPLICATIONS

This application is a U.S. National Phase Application of International Patent Application No. PCT/EP2020/060207, filed Apr. 9, 2020, which claims priority to European Patent Application No. 191688779, filed Apr. 12, 2019, the entire contents of which are hereby incorporated by reference herein.

FIELD OF THE INVENTION

The present invention relates to data management. In particular, the present invention relates to a data extraction system for extracting data from one or more tabular data files, to a distributed database system, to a computer-implemented method for extracting data from one or more tabular data files, to a computer program element, and to a computer readable medium.

BACKGROUND OF THE INVENTION

In many environments, e.g. a laboratory environment, a production environment, or a business-related environment, a huge amount of data may be gathered from various sources. For example, in a laboratory environment, files may stem from numerous experimental tests conducted in the past using various lab equipment, in which most of the data had been captured, documented and exchanged using tabular data files, such as Excel files. This may produce hundreds to thousands of such files per project.

As many of these files already include a tabular data structure inherently, automatic extraction is usually straightforward given that this structure remains consistent across all files of a given project. In this case, the data can be easily migrated to any other system to be used for data analytics. However, once this structure deviates only slightly within files, data extraction may become a more difficult and often time-consuming process, which may require rigorous manual data structuring and clean-up.

SUMMARY OF THE INVENTION

There may be a need to extract data from one or more tabular data files effectively and reliably.

The object of the present invention is solved by the subject-matter of the independent claims, wherein further embodiments are incorporated in the dependent claims. It should be noted that the following described aspects of the invention apply also for the data extraction system for extracting data from one or more tabular data files, the distributed database system, the computer-implemented method for extracting data from one or more tabular data files, the computer program element, and the computer readable medium.

According to a first aspect of the present invention, a data extraction system is provided for extracting data from one or more tabular data files. The system comprises a user interface adapted for facilitating one or more users to submit one or more tabular data files, each tabular data file comprising at least one table.

According to the first alternative, the user interface is configured to receive a user-defined template comprising at least one target table. The data extraction system further comprises a data extraction module. The data extraction module comprises a schema-level matcher and an instance-level matcher. The schema-level matcher is configured to identify target schema-level information of the at least one target table, and to select at least one semantically matched candidate table from the submitted one or more tabular data files based on the target schema-level information. The instance-level matcher is configured to identify target instance-level information of the at least one target table and to extract data from the at least one semantically matched candidate table based on the target instance-level information.

According to the second alternative, the user interface is configured to receive a validator template. The data extraction system further comprises a validator configured to apply the validator template to at least one table of the one or more tabular data files to validate a table format of the at least one table based on rules for markers, metadata and/or data defined by the validator template.

In other words, a hybrid matcher may be provided for directly combining a schema matching and an instance matching to extract tables from a series of tabular files (e.g. Excel files) based on a user-defined template. The one or more tabular data files may comprise data obtained from at least one of: a laboratory environment, a production environment, and business-related environment. For example, the one or more submitted tabular data files may comprise experimental data obtained from a laboratory environment. The experimental data may comprise data produced by a measurement, test method, experimental design or quasi-experimental design. In another example, the one or more tabular data files may comprise business-related data (e.g. finance or controlling). The user-defined template defines at least one target table. To extract the tables, the properties of at least one target table are determined, which serve as an information source for providing two types of information including schema-level information and instance-level information. The schema-level information relates to properties inherent to the table itself which must be fulfilled by each candidate, such as name, description, data type, relationship types (part-of, is-a, etc.), constraints, and schema structures. Schema elements of the one or more submitted tabular data files may be mapped to target tables of the user-defined template. For example, simple relations over scalars (e.g. =, <), functions (e.g. addition or concatenation), entity-relationships (e.g. is-a, part-of), or set-oriented relationships (e.g. overlap, contains) may be used. The schema-level information is used to exclude semantically unmatched candidate tables and their respective transformations. The instance-level information relates to the properties belonging to the data which are most likely different for each input table, such as data values. The instance-level information may be used to assign a score to the semantically matched candidate tables based on a similarity measure and to extract data from semantically matched candidate tables, which has a desired score. Entity matching or record-linkage may be implemented as a part of the instance-level matcher, which is used as a metric to compare tables. Entity matching is designed to identify records, which refer to the same entity. The entity matching may also be used to identify tables, which are similar to a reference table. For example, the data extraction may work as follows: i) A sample file is loaded and a user, e.g. the one who created the data in the first place, selects one example for each table type he wants to extract e.g. via a graphical user interface. This collection of example tables may also be referred to as a user-defined template. This will be explained hereafter and particularly with respect to the exemplary embodiment in FIG. 2. ii) The data extraction module scans all other files belonging to this project and extracts the most promising candidate tables. This will be explained hereafter and in particular with respect to the exemplary embodiment in FIG. 1A. iii) After a verification step by the user e.g. via a graphical report of the extraction results, all of the found and accepted tables are loaded into a database. This will be explained hereafter and particularly with respect to the exemplary embodiment in FIG. 4. iv) The user may then select the primary key(s) of each table type in the database, based on which a model or schema is auto-generated. These selections can be updated at any time to allow for a flexible schema and restructuring where needed. The schema along with its primary, foreign and unique keys are graphically displayed in the user interface. This can also be considered as a virtual whiteboard as it not only provides a good overview of the database's structure but can also serve as an efficient communication tool between different teams as it highlights the crucial data connection points.

Alternatively, a validator may be provided to validate table formats based on a validator template format to enable some consistency in data collection upfront. The validator template defines rules for markers, metadata and/or data. Each single Excel sheet e.g. may be considered as an individual and irreducible source of data, i.e. the smallest structure. In each Excel sheet, markers define the data and metadata information inside the sheet. Examples of the markers include, but not limited to, HEADER marker, KEY_TYPE marker, KEY_SUFFIX marker, UNITS marker, QUALIFIER marker, NOTES marker, FORMAT marker, TYPE marker, DATA marker. For example, the HEADER marker may include, but not limited to, a mandatory marker, name/label for identifier, such as primary and foreign keys and attributes, label names and naming convention, blank Headers. The KEY_TYPE marker is used to create logical connections between different sheets including one-to-one or one-to-many relationships. The DATA marker is used to indicate that rows or columns contain data points. The FORMAT marker defines the basic data types of the data values in the DATA section, which may include quantity (e.g. integers, real valued numbers, strings in scientific notation), string, and date (Excel time (5 digits) or dd/mm/yyyy). The UNITS marker contains the units of the data, preferably in SI-units. The NOTES marker is an additional, human readable expansion of the header. Different rules may be applied for each marker. For example, rules for HEADER marker may include, but not limited to, i) header label must not contain any special character, ii) header label must begin with a character, iii) header label must not contain any whitespaces, iv) header label must not contain any dashes, header label should be formatted in lower case, v) header name of primary key must be unique within data sheet, and vi) no primary key is present that matches the foreign key. Rules for the DATA marker may include, but not limited to, i) data field value (QUANTITY) must only contain valid numbers, ii) missing value, iii) invalid date in format, dd/mm/yyyy, and iv) identifier of primary key DATA is not globally unique. An example rule for the KEY_TYPE marker is that primary key type is only allowed a single time per sheet. For example, the validator may work as follows: i) a collection of files containing tabular data structures is analyzed and rules for markers, metadata and/or data are defined based on an analysis of the collection of files, for example, by a designated data scientist. ii) From the rules, a validator template is derived, which for a given table verifies e.g. formatting of labels, numbers, data and time, uniqueness of identifiers and attributes, uniqueness of completeness and integrity of metadata, and a logical structure based on primary and foreign keys. iii) The validator template is then applied to the original files and decline any which violate the criteria described in ii).

Both the data extraction module and the validator provide a simple and fast data aggregation method, thereby allowing for a more robust, broad and reliable data analysis e.g. in a distributed lab system.

In particular, by using the data extraction module, effectiveness may be improved because semantically unmatched candidates may be filtered out early and only semantically matched candidates may be evaluated further to be assigned a score indicating their similarity to the tables in the template. Additionally, unlike an entirely index-based approach, the use of the schema-level matcher and instance-level matcher may also be applied to another file even if the table of interest is not at exactly the same position, e.g. shift of table locations, transposed tables, or additional table columns, etc. Hence, a small number of templates may be required to successfully parse and integrate an entire project into a well-defined database structure. This may be beneficial for the tabular files collected from different sources, e.g. from different labs using different Excel sheets in a distributed lab system. As the tabular files from different sources may have various formats, proper data analysis may be precluded. The hybrid matcher may allow to gather and clean such inhomogeneous data, thereby allowing for a more robust, broad, and reliable data analysis. Additionally, as will be explained hereafter, the hybrid matcher may also use machine learning to provide access to a large amount of historic data. This may provide an automated support for data analysis, which may make it easier to build application-specific tools that include automatic data extraction.

By using the validator, table formats of the submitted tabular data files are validated based on a template format to enable some consistency in data collection upfront. In some examples, the validator template may be defined for Excel tables of e.g. one lab. In some examples, the validator template may vary across different labs. Inconsistency may be graphically reported to the user e.g. via the user-interface or corrected automatically. With the aid of a consistency step up front, the submitted tabular data files may be structured automatically, thereby reducing any data search, cleaning and validation efforts once it needs to be accessed e.g. for machine learning or other data-drive modeling. This may also allow a higher success rate for finding associated data files across e.g. different labs or different production units.

According to an embodiment of the present invention, the instance-level matcher is configured to determine a similarity measure between the at least one semantically matched candidate table and at least one target table and to extract data from at least one semantically matched candidate table whose similarity measure exceeds a given threshold.

For example, the instance-level matcher may be a constraint-based matcher that determines corresponding match candidate based on a constraint-based characterization, such as numerical value ranges and averages or character pattern. In another example, the instance-level matching may be performed by using a per-instance match. For example, a record-linkage process may be used to determine records in a data set, which link to the same entity. This may be done by defining a similarity measure between all records and then assigning any records whose similarity exceeds a certain threshold to be of the same entity.

According to an embodiment of the present invention, the similarity measure is assigned for each column of the target table in a cascading fashion: i) the similarity measure is specified for each column of the target table; ii) the similarity measure is specified for all columns of a particular type; and iii) all remaining columns are set to a default similarity, which is optionally user-customized.

For example, if the user does not override anything, the default similarity measure is the Jaro-Winkler distance, which is a string metric measuring an edit distance between two sequences.

According to an embodiment of the present invention, the schema-level matcher is configured to transform at least one table of one or more submitted tabular data files into at least one transformed table to match a format defined by at least one target table and to select at least one semantically matched candidate table from the at least one transformed table.

As users may choose their layout freely such that it best fits the needs, a list of inhomogeneities may exist in the submitted tabular data files, e.g. position of tables changes, tables are transposed, additional columns which have been added in between, etc. A transformation may be used to transpose a table, extract a larger sub-table, remove redundant a column, and/or permute the remaining ones. Such a transformation may solve the problem of inhomogeneities across submitted tabular data files, thereby reducing any data search, cleaning and validation efforts once it needs to be accessed e.g. for machine learning or other data-driven modeling.

According to an embodiment of the present invention, the transformation comprises at least one of: extracting a sub-table from at least one table, transposing at least one table, permuting columns of at least one table, and removing at least one column or row containing un-matched schema-level information from at least one table.

According to an embodiment of the present invention, the schema-level matcher is configured to perform a sequence of operations on the at least one table of one or more submitted tabular data files defining a tree structure with a plurality of edges and a plurality of nodes, each edge corresponding to a basic transformation of a parent node with one or more free parameters and each node corresponding to a transformed table of the respective basic transformation. The schema-level matcher is configured to select at least one transformed table at a plurality of leaf nodes of the tree structure, whose similarity to at least one target table is higher than that of the remaining transformed tables. The schema-level matcher is configured to select at least one semantically matched candidate table from at least one selected transformed table.

For a transformation, there may be many free parameters, e.g. indices of columns to be removed/transposed, and thus the resulting amount of candidate tables may be large. Finding a data wrangling transformation which meets a given set of requirements of the user, i.e. the user-defined template, may be seen as a search in the tree. Thus, a sequence of operations may be needed to determine the free parameters, such as the indices of the columns. This defines a tree structure where each edge corresponds to a basic transformation with certain free parameters and each node to the result of the respective transformation. Every leaf node, i.e. outer-most or terminal node of the tree structure, created respects the schema properties (e.g. data types of columns) of at least one target table. Otherwise, the edge leading to it would have been pruned earlier. The similarity may only be used to compare leaf nodes with at least one target table; that is, only data properties, i.e. instance-level information, of the leaf nodes are to be compared with the at least one target table. This may be done by applying the actual values of each of the cells of interest to establish a notion of similarity between the transformed candidate tables and at least one target table. The transformed tables may be ranked in order of similarity. The top ranked transformed tables may be used for instance-level matching. This may be beneficial for reducing the amount of semantically matched tables for the following instance-level matcher, as the schema-level information can be used to prune many branches early on.

According to an embodiment of the present invention, a pre-trained machine learning classifier is provided, which is adapted for performing schema matching and/or instance matching. The pre-trained machine learning classifier is configured to be trained with a sample set of tabular data files with a representative data file for parsing the tabular data files, a set of successfully parsed tabular data files, and a set of failed tabular data files.

In other words, the pre-trained machine learning classifier synthesizes transformations based on output examples only (i.e. not input-output example pairs) such that the user's workload remains constant, regardless of the number of different layouts. On the contrary, common machine learning determines the requirements necessary for a transformation based on input-output examples. The input-output pairs are usually on the level of cells in a spreadsheet such that it is often sufficient to provide only two or three examples for frameworks to synthesize a correct transformation.

According to an embodiment of the present invention, the user interface is configured to provide a report comprising at least one of the following: an overview of an extraction statistics, a responsive table of the number of tables extracted from each tabular data file, sheet, and/or table type, and an interface allowing a user to migrate the extracted tables directly to a database.

For example, the interface may allow the user to link and migrate the extracted tables to a database. That is, the information from individual files may thus be collected, linked and made searchable, such that the user may easily obtain all of the data for a desired property. In addition, the user may at any time download this collection as an Excel or CSV file if required, for example, as input of other software of analytics pipelines. The database may then be altered or connected to other databases for analysis.

According to an embodiment of the present invention, the rules for markers, metadata and/or data comprise at least one of i) formatting of labels, numbers, date and time, ii) uniqueness of identifiers and attributes, iii) uniqueness of completeness and integrity of metadata, and iv) a logical structure based on primary and foreign keys.

Examples of the formatting of labels, numbers, data and time may include, but not limited to, i) header label must not contain any special character, ii) header label is not available (NA), iii) data field value (QUANTITY) must only contain valid numbers, and iv) invalid data in format dd/mm/yyyy. Examples of uniqueness of identifiers and attributes may include, but not limited to, i) attribute name must be unique within data sheet, and ii) primary key type is only allowed a single time per sheet.

According to an embodiment of the present invention, the validator template is derivable from a user-defined schema based on an analysis of the one or more submitted tabular data files.

For example, a collection of files containing tabular data structures is analyzed and a schema for a database is designed e.g. by a designated data scientist. From this schema, a validator template is derived, which for a given table verifies the column types, uniqueness of keys, correctness of foreign keys and header values.

According to an embodiment of the present invention, the one or more tabular files have one or more formats comprising at least one of: a comma-separated values, CSV, format, and a spreadsheet file format of a Microsoft® Excel® file. Optionally, the one or more tabular files to be validated by the validator have one or more formats comprising an Open Document Format, ODF, a Lotus 1-2-3® worksheet format, a Microsoft® Works spreadsheet format, a VisiCalc® spreadsheet format, an Abykus worksheet format, and/or an Ability spreadsheet format.

According to an embodiment of the present invention, a distributed database system is provided. The distributed database system comprises one or more data repositories and a data extraction system described above and below. The one or more data repositories are configured to store tabular data files from a plurality of sources, each tabular data file comprises at least one table. The data extraction system is configured to extract data from the tabular data files based on a user-defined template comprising at least one target table.

The distributed database system may be a distributed laboratory system, a distributed production system, or a distributed business system. In a distributed laboratory system, for example, one or more data repositories may be populated from different labs using different Excel sheets. As the users may choose their layout freely such that it best fits their needs, multiple experiments from different sources may have varying formats, which may preclude proper data analysis. The data extraction system described above and below may allow to gather and clean such data and thus allows for a more robust, broad and reliable data analysis. An automated process using e.g. machine learning and other data-driven models may be enabled by providing access to a large amount of historic data.

According to a second aspect of the present invention, a computer-implemented method is provided for extracting data from one or more tabular data files.

According to the first alternative, the method comprises the following steps: a) receiving one or more tabular data files, each tabular data file comprising one or more tables, b1) receiving a user-defined template comprising at least one target table, b2) identifying target schema-level information of the at least one target table, b3) selecting at least one semantically matched candidate table from the submitted one or more tabular data files based on the target schema-level information, b4) identifying target instance-level information of the at least one target table, and b5) extracting data from the at least one semantically matched candidate table based on the target instance-level information.

According to the second alternative, the method comprises the following steps: a) receiving one or more tabular data files, each tabular data file comprising one or more tables, and c) applying a validator template to at least one table of the one or more tabular data files to validate a table format of the at least one table based on a template format of the validator template.

In other words, a hybrid matcher, including a schema-level matcher and an instance-level matcher, is used for extracting data: The schema-level matcher uses schema-level information to select candidate tables (or their respective transformations) and exclude tables (their respective transformations), while the instance-level matcher uses instance-level information to assign a score to the candidate tables. The instance-level matcher will be built upon the notion of a record-linkage, usually done by defining a similarity measure between all records and then assigning any records whose similarity exceeds a certain threshold to be of the same entity. This method only learns the types (schema-level information) and values (instance-level information) of the rows/columns, not their exact position (not index-based), it is not important how and whether the locations of the tables changed at all. The method thus holds for data files coming from different labs, production units, and business departments, due to formatting and/or experiment modifications.

Alternatively, a collection of files containing tabular data structures is analyzed and rules for markers, metadata and/or data are defined based on an analysis of the collection of files, for example, by a designated data scientist. From the rules, a validator template is derived, which for a given table verifies e.g. formatting of labels, numbers, data and time, uniqueness of identifiers and attributes, uniqueness of completeness and integrity of metadata, and a logical structure based on primary and foreign keys. The validator template may then be applied to the original files and decline any which violate the criteria. In this way, automatic extraction of desired data can be achieved. According to a third aspect of the present invention, a computer program element is provided for the system described here, which, when being executed by a processing unit, is adapted to perform the method steps as described.

According to a fourth aspect of the present invention, a computer readable medium is provided having stored the program element.

As used herein, the term "user interface" refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 2 shows an example of a graphical user interface for submitting a user-defined template according to some embodiments of the present disclosure.

DETAILED DESCRIPTION OF EMBODIMENTS

In some situations where the structure deviates within the tabular data files, data extraction may become a more difficult and time-consuming process that often requires rigorous manual data structuring and clean-up. The messy data may be caused by several reasons. For example, the user may store one or more tables in a spreadsheet at different cell positions and choose their layout freely such that it best fits their work. Taking laboratory experiments for example, different labs may run similar experiments but structure their files differently. Different users may structure their files differently when no clear template has been used for documentation. Additional experiments have been added to one file but not to others.

In order to extract data from tabular data files, particularly from tabular data files with messy data, a user interface is designed to obtain the information of the file structure directly from the source, e.g. by the user who designed and filled their Excel workbook. The information of the file structure is provided within a user-defined template. This may save time on extra meetings to transfer the user's data structure knowledge to a data specialist. The hybrid matcher excludes semantically unmatched candidates based on the information of the file structure obtained from the user-defined template. Only the semantically matched candidates are further evaluated to determine whether these candidates are similar to the target tables of the user-defined template. Effectiveness may thus be improved. As the hybrid matcher only learns the types (schema-level information) and values (instance-level information) of the rows/columns, not their exact position (not index based), it is not important how and whether the locations of the tables changed at all. This may be beneficial for data extraction in the situations where the structure deviates within the tabular data files. The candidates with top ranked similarity may be extracted and migrated to a database, such that a user may easily obtain all of the data for a desired property. Alternatively, a validator may be provided to validate table formats based on a validator template format to enable some consistency in data collection upfront. The validator template defines rules for markers, metadata and/or data. With the aid of a consistency step up front, the submitted tabular data files may be structured automatically, thereby reducing any data search, cleaning and validation efforts once it needs to be accessed e.g. for machine learning or other data-drive modeling. This may also allow a higher success rate for fining associated data files across e.g. different labs or different production units. This will be explained in more detail in the following exemplary embodiments.

Figure 1A:
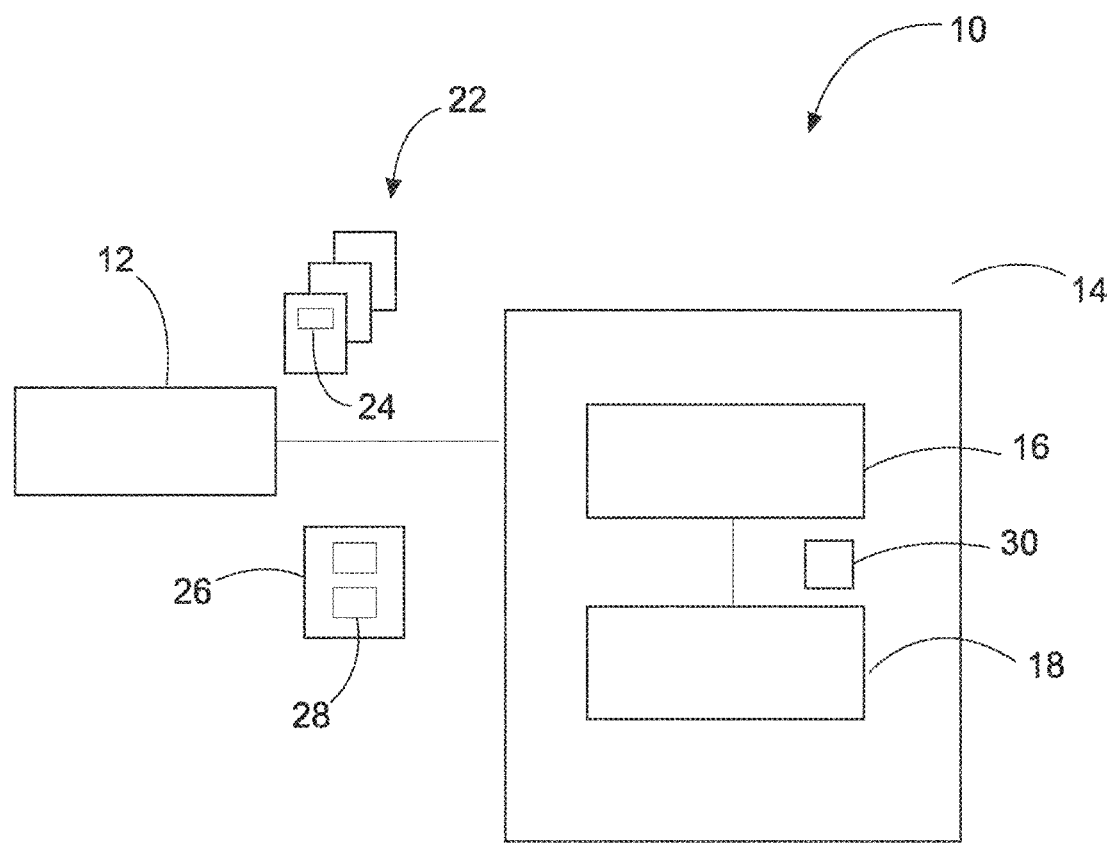
FIG. 1A shows a block diagram of a data extraction system according to some embodiments of the present disclosure.

FIG. 1A shows a block diagram of an example of a data extraction system 10 for extracting data from one or more tabular data files. The data extraction system 10 comprises a user interface 12 and a data extraction module 14. The data extraction module 14 comprises a schema-level matcher 16 and an instance-level matcher 18.

The user interface 12 is configured to facilitate one or more users to submit one or more tabular data files 22, each tabular data file comprising at least one table 24. The user interface 12 may be an interactive interface including, but not limited to, a Graphical User Interface (GUI), a character user interface or a touch screen. A user may assess the user interface 12 via an electronic communication device including, but not limited to, a desktop, a notebook, a laptop, or a smart phone.

The one or more tabular data files 22 may contain any type of data. Examples of data include, but not limited to, data obtained from a laboratory environment, a production environment, and/or business-related environment. For example, the one or more tabular data files 22 may include experimental data from one or more labs. For example, in a lab concentrating on the synthesis and measurement of biodegradable polymers, the experimental data may include analytics data, solubility data, mechanical testing data, ecotoxicity tests, and/or analytics data generated from software. Production-related data may relate to the setting where software and other products are actually put into operation for their intended uses by the users. The business-related data may include data collected from e.g. finance department, controlling department, etc. Further, the one or more tabular data files 22 may have various file formats such as, but not limited to, a CSV, format, and a spreadsheet file format of a Microsoft® Excel® file.

The user interface 12 is also configured to facilitate one or more users to submit a user-defined template 26 comprising at least one target table 28 e.g. via an interface illustrated in FIG. 2. The interface of the illustrated example in FIG. 2 may look like an excel workbook that contains a collection of labelled worksheets 32a, 32b, 32c, 32d, 32e. Each labeled worksheet may comprise one or more target tables 28. For example, the labelled worksheet 32a of the illustrated example in FIG. 2 comprises two target tables 28a, 28b. In some embodiments, the user-defined template may be a JavaScript Object Notation (JSON) file, which may contain the template name, the name of the file used for creating the template, as well as a dictionary of the endpoints for each of the target tables in the template. The dictionary may not only contain the sheet name in which the target tables 28a, 28b are located, but also the table type name as assigned by the user as well as its exact positions in terms of indices or endpoints, such as starting row, starting column, end row, end column. These indices are stored separately from the headers, which are used to identify the property stored (temperature, sample ID, etc.) and for the data values. In addition, extra labels such as transpose and inverted provide information about the table format. The interface of the illustrated example may also include to the option to save their work. For example, the interface of the illustrated example shows the buttons allowing a user to add or remove a table from the user-defined template 26. The target tables 28 may be selected from within an exemplary file from the set of previously stored tabular data files the user wishes to extract. In other words, the user may be allowed to upload and select the tables in a single file to create the target tables 28 of the user-defined template 26.

Turing back to FIG. 1A, the data extraction module 14 communicatively couples the user interface 12 to receive the one or more tabular data files 22 and the user-defined template 26. The data extraction module 14 may be implemented in a web server. The data extraction module 14 (in the backend or server) communicatively couples the user interface 12 (in the frontend or client) via the network to receive the one or more tabular data files and the user-defined template.

The schema-level matcher 16 is configured to identify target schema-level information of the at least one target table, and to select at least one semantically matched candidate table 30 from the submitted one or more tabular data files based on the target schema-level information. The schema-level matcher 16 only considers schema information, not instance data. The schema information may include properties of schema elements, such as name, description, data type, relationship types (part-of, is-a, etc.), constraints, and schema structures. In some embodiments, the schema-level information may include a column type, whether or not a column is nullable, and a data type. The data type may include a fundamental type, a structural type, and/or a custom type. The fundamental type may correspond to a fundamental data type and may be totally ordered, which may include int, float and str. The structural type may describe or establish a certain structure, including empty, unknown and occupied. The custom type may be a defined subset of strings, e.g. additive identifiers, molecular formulas, etc. In some embodiments, the schema-level matcher 16 may utilize one or more approaches to identify one or more semantically matched candidate tables. For example, the schema-level matcher 16 may comprise a linguistic matcher that uses names and text including words or sentences to find semantically similar schema elements. Name-based matching may match schema elements with equal or similar names, such as exp. equal to experiment. In some embodiments, the schema-level matcher 16 may comprise a description-based matcher that determines the similarity between schema elements based on comments accompanying the schema elements. In general, the schema-level matcher 16 may find multiple semantically matched candidates. For each candidate, a degree of similarity by a normalized numeric value in the range of 0 to 1 may be estimated, in order to identify suitable candidates to be outputted to the instance-level matcher 18. In terms of the schema properties, it may only consider the column types and whether or not the columns are nullable. Generally, these schema properties are the only information that can be deduced reliably and without any additional user input besides the user-defined template. In some embodiments, header names may not be required to be consistent as this condition may be violated to such an extent, where one could consider them to be essentially random. In some embodiments, relatively similar or completely matching headers throughout a dataset may be a very powerful condition, which helps to simplify the transformation problem considerably.

The instance-level matcher 18 is configured to identify target instance-level information of the at least one target table 28 and to extract data from the at least one semantically matched candidate table 30 based on the target instance-level information. In other words, the instance-level matcher 18 considers only instance data, i.e. data contents. For example, the actual values of each of the cells of the table may be considered. The actual values of each of the cells may include structured data, such as numerical and string elements. For such data, a constraint-based characterization, such as numerical value ranges and averages or character pattern may be applied. The record-linkage process is used to determine records in a dataset, which link to the same entity. For example, the instance-level matcher 18 is configured to determine a similarity measure between the at least one semantically matched candidate table and the at least one target table and to extract data from the at least one semantically matched candidate table whose similarity measure exceeds a reference value. In other words, this may be done by defining a similarity measure between all records and then assigning any records whose similarity exceeds a certain threshold to be of the same entity. The similarity measure may be assigned for each column of the target table in a cascading fashion: i) the similarity measure is specified for each column of the target table, ii) the similarity measure is specified for all columns of a particular type, and iii) all remaining columns are set to a default similarity, which is optionally user-customized. The default similarity measure may be the Jaro-Winkler distance, which is a string metric measuring an edit distance between two sequences. In some embodiments, the actual values of each of the cells of interest may be used. This information may be applied to establish a notion of similarity between any tables with matching schema properties. For the target table, a similarity measure may be registered for every column. The default similarity is the Jaro-Winkler edit distance. With these column similarities, a similarity between individual rows may be defined. Thus, the similarity between two tables may simply be the average pairwise row similarity.

Optionally, the schema-level matcher 16 may be configured to transform the at least one table 24 of the one or more submitted tabular data files 22 into at least one transformed table to match a format defined by the at least one target table and to select at least one semantically matched candidate table from at least one transformed table. For example, the transformation may comprise at least one of: extracting a sub-table from at least one table, transposing at least one table, permuting columns of at least one table, and removing at least one column containing un-matched schema-level information from at least one table. In other words, a transformation may be used to transpose a table, extract a larger sub-table, remove a redundant column, and/or permute the remaining ones. The transformation may also be referred to as data wrangling. Data wrangling describes the transformation of unstructured data to data with a well-structured format. Various tools have been developed to generate such transformations in a semi- or fully-automated manner. All of these tools contain a pool of basic transformations which are concatenated to synthesize the desired transformations.

Figure 1B:
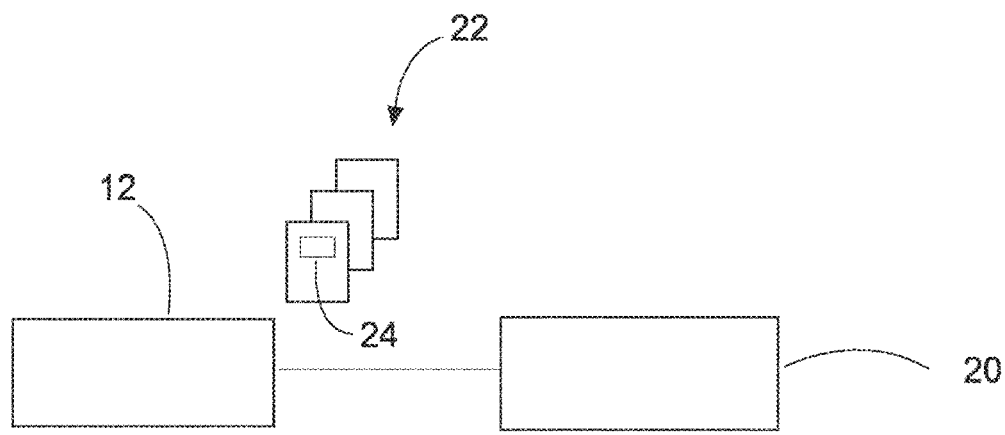
FIG. 1B shows a block diagram of a data extraction system according to some other embodiments of the present disclosure.

FIG. 1B shows a block diagram of a further example of a data extraction system 10 for extracting data from one or more tabular data files. In this example, alternative to the extraction module 14, a validator 20 may be used. The validator 20 is configured to apply a validator template to at least one table of the one or more tabular data files to validate a table format of the at least one table based on rules for markers, metadata and/or data defined by the validator template. The one or more tabular files have one or more formats comprising at least one of: a comma-separated values, CSV, format, and a spreadsheet file format from a Microsoft® Excel® file, an Open Document Format, ODF, a Lotus 1-2-3® worksheet format, a Microsoft® Works spreadsheet format, a VisiCalc® spreadsheet format, an Abykus worksheet format, and an Ability spreadsheet format. The rules for markers, metadata and/or data comprise at least one of i) formatting of labels, numbers, data and time, ii) uniqueness of identifiers and attributes, iii) uniqueness of completeness and integrity of metadata, and iv) a logical structure based on primary and foreign keys. The validator template may be derivable from a user-defined schema based on an analysis of the one or more submitted tabular data files.

Figure 3:
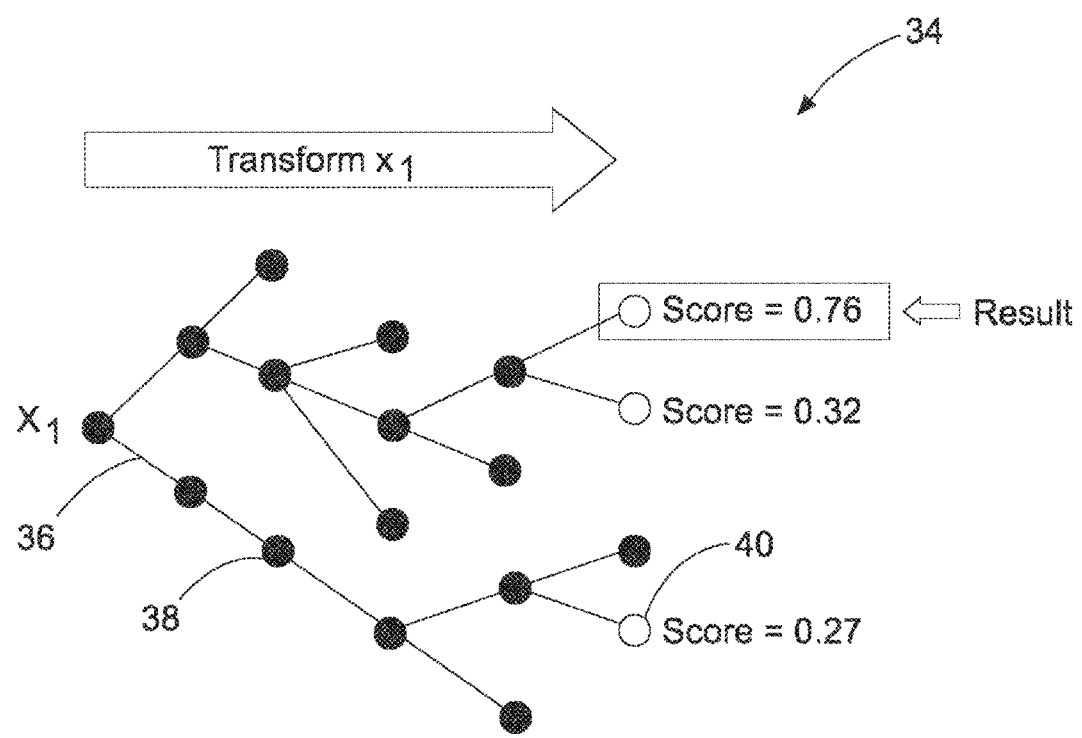
FIG. 3 shows an example of synthesizing and evaluating the transformations of a candidate table according to some embodiments of the present disclosure.

FIG. 3 shows an example of synthesizing and evaluating the transformations of a candidate table in accordance with an embodiment of the present disclosure. The schema-level matcher 16 is configured to perform a sequence of operations on the at least one table 24 of the one or more submitted tabular data files 22 defining a tree structure 34 with a plurality of edges 36 and a plurality nodes 38. Each edge 36 corresponds to a basic transformation of a parent node with one or more free parameters and each node 38 corresponds to a transformed table of the respective basic transformation. The schema-level matcher is configured to select at least one transformed table at a plurality of leaf nodes 40 of the tree structure, whose similarity to the (at least one) target table is higher than that of the remaining transformed tables. The schema-level matcher 16 is configured to select at least one semantically matched candidate table 30 from at least one selected transformed table. The leaf nodes 40 are the outer-most or terminal nodes of the tree structure 34. For example, a score may be assigned to each leaf node 40 representing the similarity. In the illustrated example in FIG. 3, the leaf node 40 with a score of 0.76 may be selected. The corresponding transformed candidate table may be used for data extraction. Then, the instance-level matcher 18 is configured to extract data from the at least one selected transformed candidate table, i.e. the leaf node with a score of 0.76. In some embodiments, the score may be calculated in a manner similar to the similarity measure above. In some embodiments, it may be done by calculating the rows of at least one target table with the highest similarity, also referred to as centroids, relative to all other rows in that target table, and compare against those. Furthermore, the target table may be updated after every n successfully parsed candidate tables, where n generally increases throughout the parsing process. This procedure may ensure that the evaluation of all transformations is performant for any use-cases at hand.

Optionally, a pre-trained machine learning classifier may be provided, which is adapted for schema matching and/or instance matching. The pre-trained machine learning classifier may be trained with a sample set of tabular data files with a representative data file for parsing the tabular data files, a set of successfully parsed tabular data files, and a set of failed tabular data files.

Before training the pre-trained machine learning classifier, the following steps may be carried out. First, a representative tabular data file of a particular project has been uploaded and several tables of interested in the representative tabular data file have been highlighted/selected by the user for the extraction process. From this, a template dictionary is obtained which describes the position of every table type of interest. Then, the template dictionary can be applied to all other files in the particular project. For each file, this can either succeed or fail, depending on the data quality (i.e. cleanliness), effectively splitting the files into two sets. Furthermore, a sample is selected from the failed set and a survey is conducted as to why it failed, e.g. tables being in the wrong position, columns being in the wrong order, etc. Based on the survey, a list of inhomogeneities are derived which can be directly translated into a sequence of operations which are required to successfully parse the data.

This provides essentially all of the input required by the pre-trained machine learning classifier, namely the template dictionary and set of successfully parsed files. Optionally, the user may define their own similarity measures to be used for all target tables.

Then, the pre-trained machine learning classifier may be trained in the following manner. At first, it builds the similarity measures and prepares the logistic regression classifiers. It then uses the template dictionary and applies it to the successfully parsed files, from which it can derive the correct training samples. From these training samples, it can also compute the schema properties of the target tables. In the same fashion, it derives incorrect training samples from the files for which the template has failed. Furthermore, it uses the successfully parsed files and shifts the template slightly to derive even more invalid training samples. In this way, numerous so-called critical examples can be obtained. For each target table, it then computes the similarity matrix from the valid and invalid samples. The matrix, together with a vector which labels the rows as correct or incorrect, is then used to train a logistic regression classifier. The weights learned by the classifier are used to update the similarity measure. With the new similarities, the centroids, i.e. rows with highest inter-table similarity, are computed for each target table. The training phase is then concluded and the pre-trained machine learning classifier is ready to parse the rest of the files.

It is noted that the pre-trained machine learning classifier determines the requirements necessary for a transformation based on output examples only, as the set of successfully parsed tabular data files and the set of failed tabular data files are both derived from the sample set of tabular data files. In other words, there are no input samples and thus no input-output example pairs. Thus, the user's workload remains constant, regardless of the number of different layouts. In addition, the pre-trained machine learning classifier is schema- and instance-based instead of position-based, such that it may be applied to other input tables of different layouts. In other words, it may be used for the situations where the structure deviates within the tabular data files.

In some embodiments, the user interface 12 may be configured to provide a report 42 comprising at least one of the following: an overview of an extraction statistics, a responsive table of the number of tables extracted from each tabular.

Figure 4:
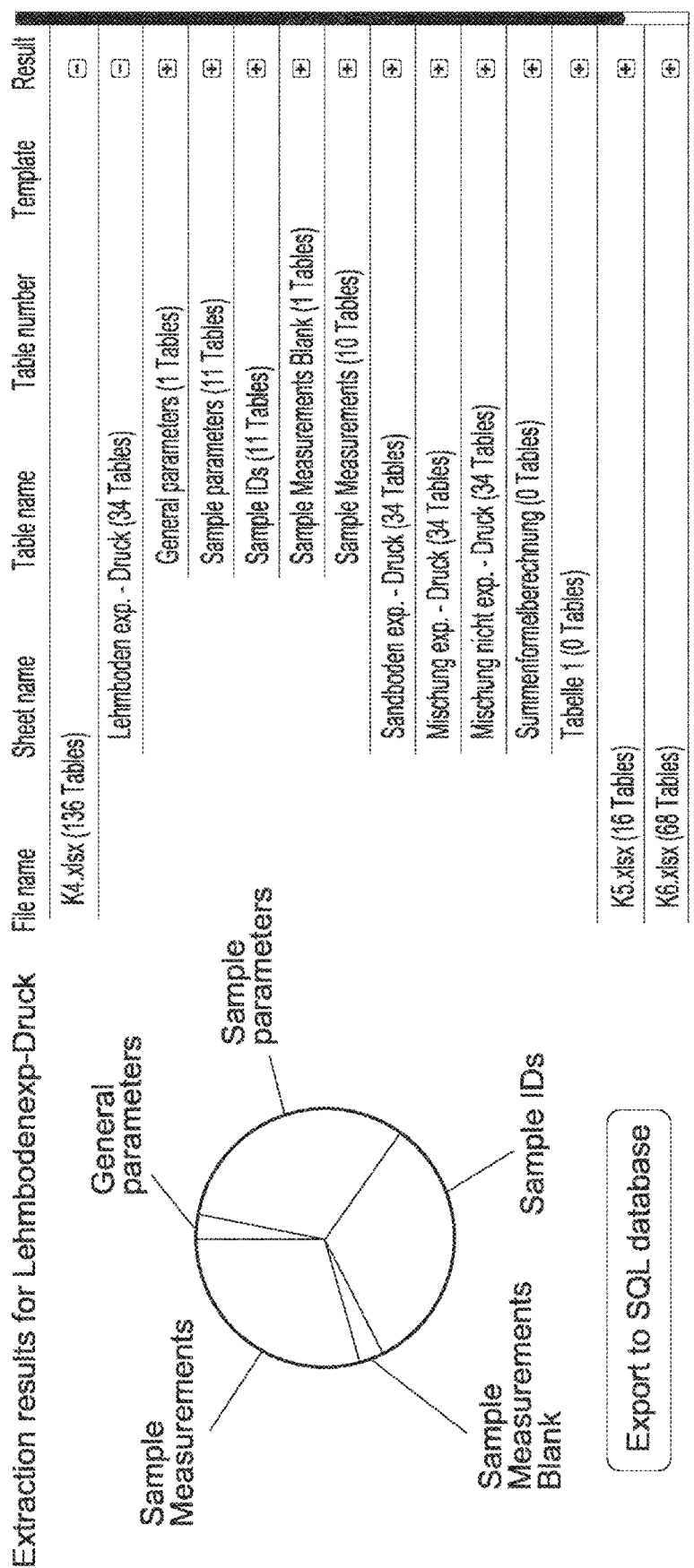
FIG. 4 shows an example of a graphical user interface for viewing the extraction report according to some embodiments of the present disclosure.

FIG. 4 shows an example of a graphical report in accordance with an embodiment of the present disclosure. In the illustrated example, the user interface illustrates a pie chart overview of the extraction statistics on the left. On the right side of the interface, a responsive table of the number of tables extracted for each file is illustrated. The tables may be linked and migrated to a database via a simple button press from the user interface. In addition, the user may also download this collection as an Excel or csv file at any time if required, for example, as input of other software or analytics pipelines.

Figure 5:
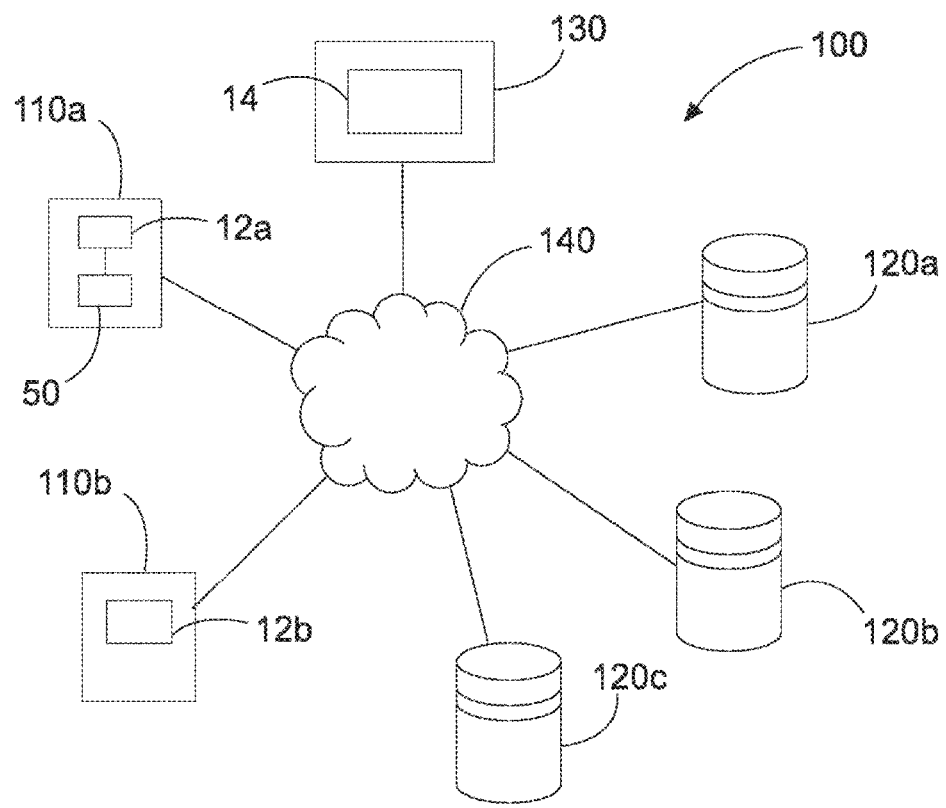
FIG. 5 shows an example of a distributed database system according to some embodiments of the present disclosure.

In some implementations, the data extraction system 10 may be implemented in a distributed database system 100 as shown in FIG. 5, such as, but not limited to, a distributed laboratory system, a distributed production system, and a distributed business system. The distributed database data extraction system 100 of the illustrated example comprises a plurality of electronic communication devices 110, such as electronic communication devices 110a, 110b, and a plurality of data repositories 120, such as data repositories 120a, 120b, 120c, a web server 130, and a network 110. For simplicity, only two electronic communication devices 110a, 110b and three data repositories are illustrated. However, the following discussion is also scalable to a large number of electronic communication devices 110 and a large number of data repositories 120.

The electronic communication devices 110a, 110b of the illustrated example may be a desktop, a notebook, a laptop, a mobile phone, a smart phone and/or a PDA. In some embodiments, the electronic communication devices 110a, 110b may also be referred to as clients. Each electronic communication device 110a, 110b may comprise a user interface 12a, 12b configured to facilitate one or more users to submit one or more tabular data files 22, each tabular data file comprising at least one table 20, and a user-defined template 24 comprising at least one target table 26. The user interface 12 may be an interactive interface including, but not limited to, a GUI, a character user interface and a touch screen interface. Optionally, the electronic communication device 110a, 110b of the illustrated example may comprise a storage 50 for storing experimental data, production data, and/or business data.

The data repositories 120a, 120b, 120c may be databases that receive data produced in a production environment, a business environment, and/or a laboratory environment. For examples, the three data repositories may collect experimental data from different labs. These labs may be in the same physical location or in different cities, states, and/or countries, which are interconnected with a network. In another example, the three data repositories may collect production data from different production sites, either in the same physical locations or dispersed over different physical sites. The data repositories 120a, 120b, 120c of the illustrated example may be any type of database including a server, a database, a file, etc.

The web server 130 of the illustrated example may be a server that provides a web service to facilitate management of data in the plurality of data repositories 120a, 120b, 120c and in the storage 50. The web server 130 may comprise the data extraction module 14 as describe above and below. In some embodiments, the web server 130 may interface with users e.g. via webpages, desktop apps, mobile apps to facilitate the management of data. Alternatively, the web server 130 of the illustrated example may be replaced with another device (e.g. another electronic communication device) that provides any type of interface (e.g. a command line interface, a graphical user interface). These interfaces, such as webpages, desktop apps, mobile apps, may allow the user to manage data using the electronic communication devices 110a, 110b via the network 140. The web server 130 may also include an interface through which a user can authenticate (by providing a username and password). For example, a user account may be used for authenticating a system user to utilize the web server 130 to access some of the data repositories to submit one or more tabular data files stored thereon and to extract data from these tabular data files.

The network 140 of the illustrated example communicatively couples the plurality of electronic communication devices 110a, 110b, the plurality of data repositories 120a, 120b, 120c, and the web server 130. In some embodiments, the network may be the internet. Alternatively, the network 140 may be any other type and number of networks. For example, the network 140 may be implemented by several local area networks connected to a wide area network. For example, the electronic communication device 110a and the data repository 120a may be associated with a first local area network of a first laboratory and the electronic communication device 110b and the data repository 120b may be associated with a second local area network of a second laboratory. The web server 130 may be associated with a third local area network. The first, second, and third local area networks may be connected to a wide area network. Of course, any other configuration and topology may be utilized to implement the network 140, including any combination of wired network, wireless networks, wide area networks, local area networks, etc.

Figures 6A, 6B:
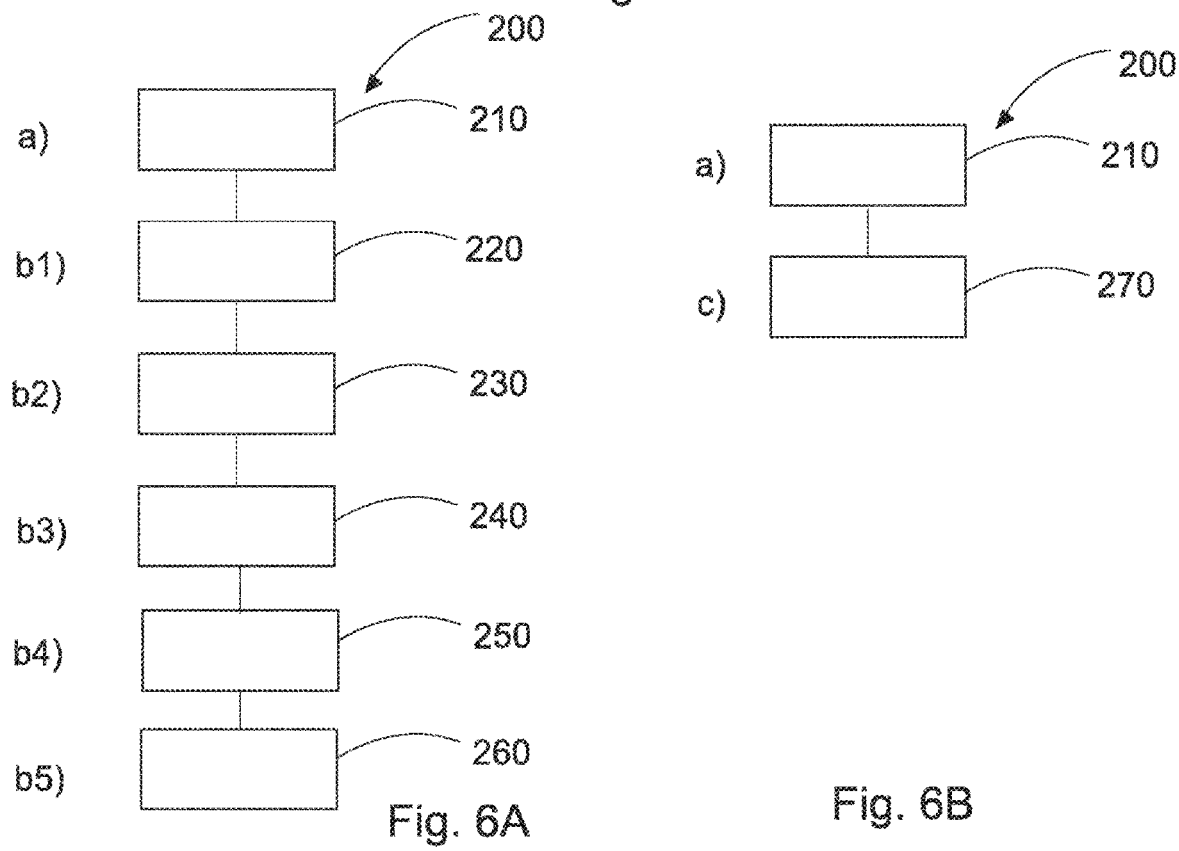
FIG. 6A shows a flowchart illustrating a computer-implemented method for extracting data from one or more tabular data files according to some embodiments of the present disclosure.
FIG. 6B shows a flowchart illustrating a computer-implemented method for extracting data from one or more tabular data files, in accordance with another embodiment of the present disclosure.

FIG. 6A shows a flowchart illustrating a computer-implemented method 200 for extracting data from one or more tabular data files, in accordance with an embodiment of the present disclosure.

In step 210, i.e. step a), one or more tabular data files are provided. Each tabular data file comprises one or more tables. In some embodiments, the one or more tabular data files may be submitted via a user interface by one or more users. The user interface may be an interactive interface including, but not limited to, a GUI, a character user interface and a touch screen interface. A user may assess the user interface via an electronic communication device including, but not limited to, a desktop, a notebook, a laptop or a smart phone. The one or more tabular data files may contain any type of data. Examples of data include, but not limited to, data obtained from a laboratory environment, a production environment, and/or business-related environment. For example, the one or more tabular data files may include experimental data from a distributed lab system. Further, the one or more tabular data files may have various file formats such as, but not limited to, a CSV, format, and a spreadsheet file format from a Microsoft® Excel® file.

Step b) comprises steps b1) to b5) for extracting data from one or more tabular data files.

In step 220, i.e. step b1), a user-defined template is provided that comprises at least one target table. The user may select target tables from an existing tabular data file (i.e. historical data) in a database.

In step 230, i.e. step b2) target schema-level information of the at least one target table is identified. The schema-level information relates to properties inherent to the table itself which must be fulfilled by each candidate, such as name, description, data type, relationship types (part-of, is-a, etc.), constraints, and schema structures.

In step 240, i.e. step b3), at least one semantically matched candidate table is selected from the one or more tabular data files based on the target schema-level information. One or multiple approaches may be used to identify one or more candidate tables. For example, a linguistic matcher may be used that uses names and text including words or sentences to find semantically similar schema elements. Name-based matching may match schema elements with equal or similar names. A description-based matcher may be used that determines the similarity between schema elements based on comments accompanying the schema elements. A constraint-based matcher may be used that determines the similarity based on the constraints defining e.g. data types and value ranges, uniqueness, optionality, relationships and cardinalities. In general, the schema-level matcher 16 may find multiple match candidates. For each candidate, a degree of similarity by a normalized numeric value in the range of 0 to 1 may be estimated, in order to identify suitable candidates to be outputted to the instance-level matcher.

In some embodiments, the schema-level matcher is configured to transform at least one table of the one or more submitted tabular data files into at least one transformed table to match a format defined by at least one target table and to select at least one semantically matched candidate table from the at least one transformed table. The transformation comprises at least one of: extracting a sub-table from at least one table, transposing at least one table, permuting columns of at least one table; and removing at least one column containing un-matched schema-level information from at least one table.

In some embodiments, a sequence of operations is performed on at least one candidate table defining a tree structure with a plurality of edges and a plurality nodes. Each edge corresponding to a basic transformation of a parent node with one or more free parameters and each node corresponds to a transformed candidate table of the respective basic transformation. At least one transformed candidate table is selected at a plurality of leaf nodes of the tree structure which has a higher similarity to the at least one target table than the remaining transformed candidate tables. The instance-level matcher is configured to extract data from the at least one selected transformed candidate table, which data has instance-level information matching the target instance-level information.

In step 250, i.e. step b4), target instance-level information of at least one target table are identified. The instance-level information relates to the actual value of each cell.

In step 260, i.e. step b5), data are extracted from at least one semantically matched candidate table based on the target instance-level information. For example, a constraint-based matcher may be used that determines corresponding match candidate based on a constraint-based characterization, such as numerical value ranges and averages or character pattern. For example, a record-linkage approach may be used to determine records in a dataset which link to the same entity.

In some embodiments, a similarity measure between the instance-level information of the at least one candidate table and the target instance-level information of the at least one target table is determined and data are extracted from the at least one candidate table with the determined similarity measure exceeding a reference value. The similarity measure may be assigned for each column or each row of the target table in a cascading fashion: i) the similarity measure is specified for each column of the target table, ii) the similarity measure is specified for all columns of a particular type, and iii) all remaining columns are set to a default similarity, which is optionally user-customized.

The method only learns the types (schema-level information) and values (instance-level information) of the columns, not their exact position (not index based), it is not important how and whether the locations of the tables changed at all. This method thus holds for data files coming from different labs, production units, business departments, due to formatting and/or experiment modifications.

FIG. 6B shows a flowchart illustrating a computer-implemented method 200 for extracting data from one or more tabular data files, in accordance with another embodiment of the present disclosure.

In step 210, i.e. step a), one or more tabular data files are provided. Each tabular data file comprises one or more tables. In some embodiments, the one or more tabular data files may be submitted via a user interface by one or more users. The user interface may be an interactive interface including, but not limited to, a GUI, a character user interface and a touch screen interface. A user may assess the user interface via an electronic communication device including, but not limited to, a desktop, a notebook, a laptop or a smart phone. The one or more tabular data files may contain any type of data. Examples of data include, but not limited to, data obtained from a laboratory environment, a production environment, and/or business-related environment. For example, the one or more tabular data files may include experimental data from a distributed lab system.

Further, the one or more tabular data files may have various file formats such as, but not limited to, a CSV, format, and a spreadsheet file format from a Microsoft® Excel® file, an Open Document Format, ODF, a Lotus 1-2-3® worksheet format, a Microsoft® Works spreadsheet format, a VisiCalc®spreadsheet format, an Abykus worksheet format, and an Ability spreadsheet format.

In step 270, i.e. step c), a validator template is applied to at least one table of the one or more tabular data files to validate a table format of the at least one table based on a template format of the validator template. The rules for markers, metadata and/or data may comprise at least one of i) formatting of labels, numbers, data and time, ii) uniqueness of identifiers and attributes, iii) uniqueness of completeness and integrity of metadata, and iv) a logical structure based on primary and foreign keys. The validator template is derivable from a user-defined schema based on an analysis of the one or more submitted tabular data files.

It will be appreciated that the above operation may be performed in any suitable order, e.g., consecutively, simultaneously, or a combination thereof, subject to, where applicable, a particular order being necessitated, e.g., by input/output relations.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." In other words, the indefinite article "a" or "an" does not exclude a plurality.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A computer-implemented method (200) for extracting data from one or more tabular data files, the method comprising:
   a) providing (210) one or more tabular data files, each tabular data file including one or more tables; and
   performing step b);
   wherein step b) comprises:
      b1) providing (220) a user-defined template including at least one target table used for a data analytics pipeline;
      b2) identifying (230) target schema-level information of the at least one target table included in the user-defined template;
      b3) selecting (240) a plurality of semantically matched candidate tables from the one or more provided tabular data files based on the target schema-level information;
      b4) identifying (250) target instance-level information of the at least one target table included in the user-defined template;
      determining a similarity measure between instance-level information of each of the plurality of semantically matched candidate tables and the target instance-level information of the at least one target table;
      determining at least one semantically matched candidate table that has the similarity measure exceeding a given threshold;
      b5) extracting (260) data from the at least one determined semantically matched candidate table based on the target instance-level information;
      generating a file comprising the extracted data;
      storing the generated file in a database for subsequent use in importing the extracted data into the data analytics pipeline; and
      transforming the one or more tables of one or more provided tabular files into a plurality of transformed tables to match a format defined by at least one target table and to select at least one semantically matched candidate table from the plurality of transformed tables by:
         performing a sequence of operations on the one or more tables of the one or more provided tabular data files defining a tree structure (34) with a plurality of edges (36) and a plurality nodes (38), each edge corresponding to a basic transformation of a parent node with one or more free parameters and each node corresponding to a transformed table of the respective basic transformation, wherein the plurality of transformed tables at a plurality of leaf nodes (40) of the tree structure are obtained by using different transformations, each transformation representing a respective combination of one or more basic transformations;
         selecting at least one transformed table at the plurality of leaf nodes (40) of the tree structure, whose similarity to the at least one target table is higher than that of the remaining transformed tables; and
         selecting the at least one semantically matched candidate table from the at least one selected transformed table.

2. The computer-implemented method according to claim 1, wherein the similarity measure is assigned to each column of the at least one target table in a cascading fashion:
   i) the similarity measure is specified for each column of the at least one target table;
   ii) the similarity measure is specified for all columns of a particular type; and
   iii) all remaining columns are set to a default similarity, which is optionally user-customized.

3. The computer-implemented method according to claim 1, wherein the transformation comprises at least one of:
   extracting a sub-table from the at least one determined semantically matched candidate table;
   transposing the at least one determined semantically matched candidate table;
   permuting columns of at least one determined semantically matched candidate table; or
   removing at least one column or row containing unmatched schema-level information from the at least one determined semantically matched candidate table.

4. The computer-implemented method according to claim 1 further comprising:
   applying a pre-trained machine learning classifier for performing schema matching and/or instance matching, wherein the pre-trained machine learning classifier is configured to be trained with a sample set of tabular data files with a representative data file for parsing the tabular data files, a set of successfully parsed tabular data files, and a set of failed tabular data files.

5. The computer-implemented method according to claim 1, wherein a user interface is configured to provide a report including at least one of the following:
   an overview of an extraction statistics;
   a responsive table of a number of tables extracted from each tabular data file, sheet, and/or table type; and
   an interface allowing a user to migrate the extracted tables directly to the database.

6. The computer-implemented method according to claim 1, wherein a table format is further validated based on rules for markers, metadata and/or data comprising at least one of i) formatting of labels, numbers, data and time, ii) uniqueness of identifiers and attributes, iii) uniqueness of completeness and integrity of metadata, or iv) a logical structure based on primary and foreign keys.

7. The computer-implemented method according to claim 1, wherein one or more tabular files have one or more formats comprising at least one of:
   a comma-separated values, CSV, format, and a spreadsheet file format from a Microsoft® Excel® file.

8. A data extraction system (10) for extracting data from one or more tabular data files (22), the system comprising:
   a processor in communication with a data extraction module (14), and a user interface (12), wherein the data extraction module comprises a schema-level matcher (16) and an instance-level matcher (18), wherein the user interface is adapted for facilitating one or more users to submit the one or more tabular data files, each tabular data file comprising at least one table (24), and wherein the processor is configured to:
   receive, using the user interface, a user-defined template (26) comprising at least one target table (28);
   identify, using the schema-level matcher, target schema-level information of the at least one target table included in the user-defined template;
   select, using the schema-level matcher, a plurality of semantically matched candidate tables (30) from the one or more provided tabular data files based on the target schema-level information;
   identify, using the instance-level matcher, target instance-level information of the at least one target table included in the user-defined template;
   determine, using the instance-level matcher, a similarity measure between instance-level information of each of the plurality of semantically matched candidate tables and the target instance-level information of the at least one target table used for a data analytics pipeline;
   determine, using the instance-level matcher, at least one semantically matched candidate table that has the similarity measure exceeding a given threshold;
   extract, using the instance-level matcher, data from the at least one determined semantically matched candidate table based on the target instance-level information;
   generate a file comprising the extracted data;
   store the generated file in a database for subsequent use in importing the extracted data into the data analytics pipeline; and
   transform the one or more tables of one or more provided tabular files into a plurality of transformed tables to match a format defined by at least one target table and to select at least one semantically matched candidate table from the plurality of transformed tables by:
      performing a sequence of operations on the one or more tables of the one or more provided tabular data files defining a tree structure (34) with a plurality of edges (36) and a plurality nodes (38), each edge corresponding to a basic transformation of a parent node with one or more free parameters and each node corresponding to a transformed table of the respective basic transformation, wherein the plurality of transformed tables at a plurality of leaf nodes (40) of the tree structure are obtained by using different transformations, each transformation representing a respective combination of one or more basic transformations;
      selecting at least one transformed table at the plurality of leaf nodes (40) of the tree structure, whose similarity to the at least one target table is higher than that of the remaining transformed tables; and
      selecting the at least one semantically matched candidate table from the at least one selected transformed table.

9. A distributed database system, comprising:
   one or more data repositories; and
   a data extraction system according to claim 8, wherein the one or more data repositories are configured to store tabular data files from a plurality of sources, each tabular data file comprises at least one table, and wherein the data extraction system is configured to extract data from the tabular data files based on a user-defined template comprising at least one target table.

10. A non-transitory computer readable medium having stored at least one program element, when executed by a processing unit adapted to perform steps comprising:
   a) providing (210) one or more tabular data files, each tabular data file including one or more tables; and
   performing step b);
   wherein step b) comprises:
      b1) providing (220) a user-defined template including at least one target table used for a data analytics pipeline;

b2) identifying (230) target schema-level information of the at least one target table included in the user-defined template;

b3) selecting (240) a plurality of semantically matched candidate tables from the one or more provided tabular data files based on the target schema-level information;

b4) identifying (250) target instance-level information of the at least one target table included in the user-defined template;

determining a similarity measure between instance-level information of each of the plurality of semantically matched candidate tables and the target instance-level information of the at least one target table;

determining at least one semantically matched candidate table that has the similarity measure exceeding a given threshold;

b5) extracting (260) data from the at least one determined semantically matched candidate table;

generating a file comprising the extracted data;

storing the generated file in a database for subsequent use in importing the extracted data into the data analytics pipeline; and transforming the one or more tables of one or more provided tabular files into a plurality of transformed tables to match a format defined by at least one target table and to select at least one semantically matched candidate table from the plurality of transformed tables by:

performing a sequence of operations on the one or more tables of the one or more provided tabular data files defining a tree structure (34) with a plurality of edges (36) and a plurality nodes (38), each edge corresponding to a basic transformation of a parent node with one or more free parameters and each node corresponding to a transformed table of the respective basic transformation, wherein the plurality of transformed tables at a plurality of leaf nodes (40) of the tree structure are obtained by using different transformations, each transformation representing a respective combination of one or more basic transformations;

selecting at least one transformed table at the plurality of leaf nodes (40) of the tree structure, whose similarity to the at least one target table is higher than that of the remaining transformed tables; and selecting the at least one semantically matched candidate table from the at least one selected transformed table.

* * * * *